Jan. 10, 1939.  W. FERRIS  2,143,147

SECTIONAL DRIVE

Filed Oct. 31, 1936  5 Sheets-Sheet 3

INVENTOR
WALTER FERRIS
BY
ATTORNEY.

Jan. 10, 1939.  W. FERRIS  2,143,147
SECTIONAL DRIVE
Filed Oct. 31, 1936   5 Sheets-Sheet 4

INVENTOR
WALTER FERRIS
BY
*Wesley P. Meniel*
ATTORNEY.

Patented Jan. 10, 1939

2,143,147

UNITED STATES PATENT OFFICE 2,143,147

SECTIONAL DRIVE

Walter Ferris, Milwaukee, Wis.

Application October 31, 1936, Serial No. 108,512

14 Claims. (Cl. 271—2.3)

This invention relates to a drive of the type employed to drive the several sections of a single machine or a group of related machines the speeds of which must be maintained proportional to each other. Drives of this type are ordinarily employed to drive the several units of a sectional machine or of a group of related machines which manufacture or process material in substantially continuous webs or strips, such as paper machines, motion picture film processing machines and the like.

The web of the material in passing through certain of the machine units varies in length due to the action of those units causing the material to stretch or shrink. Therefore, in order to maintain the proper tension upon the web, it is necessary to provide a draw between each unit that causes the material to stretch or shrink and the adjacent unit, that is, one of those units must run faster than the other unit to compensate for the variation in the length of the web.

It has heretofore been common practice to drive the several units of a sectional machine or of a group of related machines from a common line shaft through belt and cone pulley drives in order that the speeds of the units may be varied relative to each other by shifting the belts along the cone pulleys. The shaft maintains the speeds of the several units approximately proportional to each other and is ordinarily driven by a single variable speed prime mover or power plant which may be adjusted to vary its speed and thereby vary the overall speed of the sectional machine or group of machines. While drives of this type have been in use for many years, they are difficult to adjust and control and are not accurate in operation due to slipping and creeping of the belts upon the cone pulleys.

The present invention has as an object to provide a sectional drive which will be free from the disadvantageous characteristics of the prior sectional drives.

Another object is to provide a drive which will be positive and precise in operation.

Another object is to provide a drive which will permit a plurality of sectional machines or a plurality of groups of machines to operate as a single machine.

Other objects and advantages will appear from the following description of a drive embodying the invention and shown schematically in the accompanying drawings in which the views are as follows.

For the purpose of illustration, the invention has been shown embodied in a drive for a film processing machine but it is to be understood that the invention is equally applicable to drives for other sectional machines or groups of related machines.

Figures 1 to 5

Figure 1:
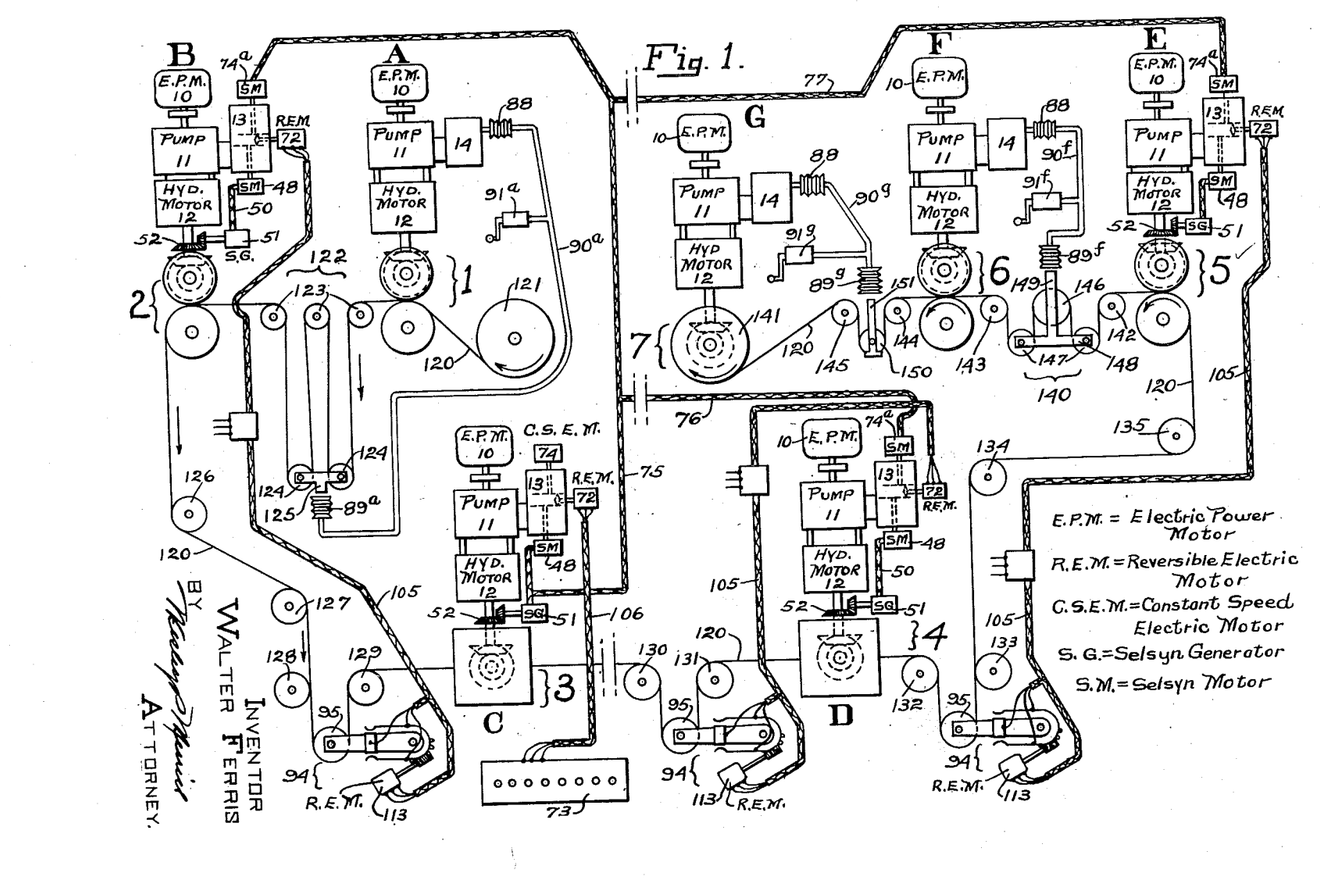
Fig. 1 is a schematic drawing showing the invention embodied in a drive for a film processing machine.

The film processing machine, which forms no part of the present invention, has been shown as including three front end units 1, 2 and 3, a plurality of intermediate units 4 of which only one has been shown, and three rear end units 5, 6 and 7. The drive has been shown as including two sections A and B which drive machine units 1 and 2 respectively, a master section C which drives machine unit 3, an intermediate section D for each unit 4, and three sections E, F and G which drive machine units 5, 6 and 7 respectively.

Each drive section includes a primary prime mover 10 which is not necessarily synchronized with the prime mover 10 of any other section and which has been indicated as being an electric motor, a generator 11 which is driven by prime mover 10 and which has been indicated as being a variable displacement pump, a secondary prime mover 12 which is driven by energy supplied thereto from generator 11 and which has been indicated as being a hydraulic motor, and a controller which varies the energy output of generator 11 and thereby varies the speed of secondary prime mover 12. Sections B, C, D and E are each shown provided with a controller 13 of the type shown in Fig. 2 while sections A, F and G are each shown provided with a controller 14 of the type shown in Fig. 3.

Controller 13 is substantially the same as the controller fully illustrated and described in my copending application Serial No. 47,008, filed October 28, 1935. Consequently, it has been shown schematically in Fig. 2 and but a brief description thereof will be given herein.

Figure 2:
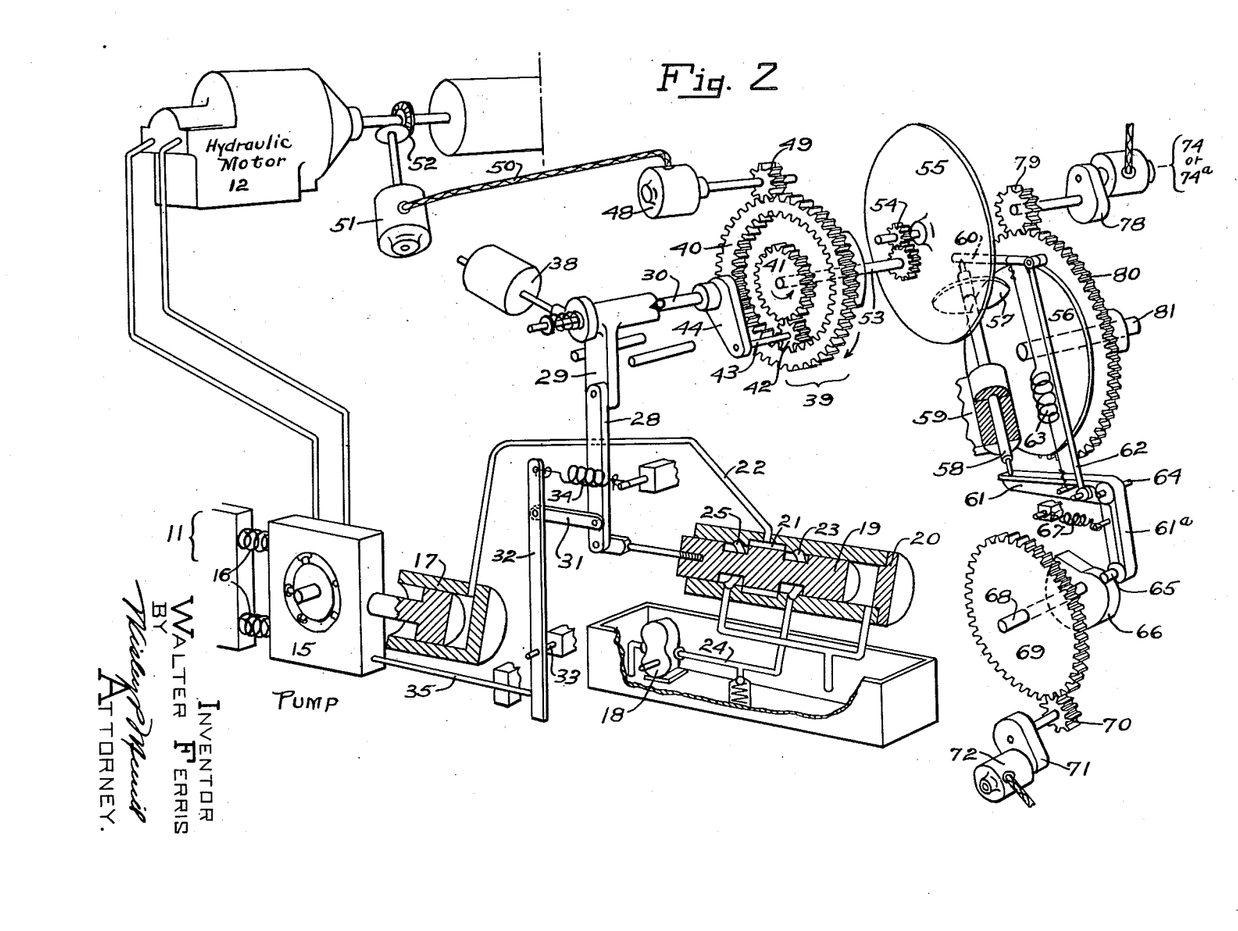
Fig. 2 is a schematic drawing of a controller which controls the operation of certain of the drive sections.

Referring now more particularly to Fig. 2, hydraulic motor 12 is shown connected to pump 11 by elongated channels but in practice the pump and motor are ordinarily arranged in a single casing. Pump 11 has been shown as being of the type fully illustrated and described in Patent No. 2,074,068. It is deemed sufficient to state that the pump is provided with a slide block 15 which may be shifted in one direction or the other to vary pump displacement.

Slide block 15 is urged toward zero displacement position by a constant force, such as two springs 16, and it is adapted to be moved toward maximum displacement position against the resistance of springs 16 by a hydraulic servo-motor 17. Liquid for operating servo-motor 17 is supplied thereto from any suitable source, such as a gear pump 18, under the control of a pilot valve 19 which is closely fitted in a valve body or casing 20 to reciprocate therein.

Valve casing 20 has formed therein a port 21 which is connected to servo-motor 17 by a channel 22, a port 23 which is arranged at one side of port 21 and connected to gear pump 18 by a channel 24, and an exhaust port 25 which is arranged at the other side of port 21.

Pilot valve 19 is so constructed that, when it is in its central or neutral position, port 21 is closed and slide block 15 is held stationary by the liquid trapped in servo-motor 17, when valve 19 is shifted toward the left from its neutral position liquid from gear pump 18 may flow through ports 23 and 21 and channel 22 to servo-motor 17 to operate the same, and when valve 19 is shifted toward the right from its neutral position liquid may escape from servo-motor 17 through channel 22 and ports 21 and 25 and thereby permit springs 16 to move the slide block 15 toward zero displacement position.

Pilot valve 19 is adapted to be shifted in one direction or the other in response to the speed of motor 12 varying relative to a measuring speed as will be presently explained.

The mechanism for shifting valve 19 includes a lever 28 which is pivoted at its lower end to the stem of valve 19 and pivoted at its upper end to the lower end of a crank 29 arranged upon a shaft 30 to rotate therewith. Lever 28 is connected intermediate its ends by a link 31 to a follow up lever 32 which is pivoted intermediate its ends upon a stationary pin 33 and has its upper end urged toward the right by a spring 34 to hold its lower end in contact with a follow up rod 35 carried by slide block 15.

The arrangement is such that, when the upper end of lever 28 is swung toward the right by crank 29, lever 28 will pivot upon link 31 and move valve 19 toward the left, thereby permitting liquid to flow to servo-motor 17 and cause it to move slide block 15 toward the left. As slide block 15 moves toward the left, rod 35 will move with it and permit spring 34 to swing lever 32 upon pin 33 and thereby move link 31 toward the right so that spring 34 tends to move valve 19 toward the right as fast as crank 29 tends to move it toward the left with the result that valve 19 is returned to its neutral position as soon as the upper end of lever 28 ceases to move. When the upper end of lever 28 is swung toward the left by crank 29, the several parts will operate in exactly the same manner but in the reverse directions.

Crank 29 is provided with a weighted arm 38 which tends to rotate it and shaft 30 in a counterclockwise direction. Shaft 30 forms a part of one leg of a differential 39 which includes an external-internal gear 40, a sun gear 41 arranged concentric with gear 40, and a planet pinion 42 which meshes with sun gear 41 and with the internal teeth of 40 so that any variation in the relative speeds of gears 40 and 41 will cause planet pinion 42 to travel around sun gear 41 in one direction or the other.

Planet pinion 42 is carried by a shaft 43 arranged in the outer end of a crank 44 which is fixed upon shaft 30 so that, when pinion 42 travels around sun gear 41 in one direction or the other, it will cause crank 44 to rotate shaft 30 and swing crank 29 and the upper end of lever 28 in one direction or the other.

Gear 40 is driven at a speed proportional to the speed of motor 12. As shown, gear 40 is driven by an electric motor 48 which is connected thereto by a gear 49 and energized by current supplied through a cable 50 from a generator 51 which is connected by gearing 52 to motor 12 and driven in unison therewith. Motor 48 and generator 51 are preferably of the self-synchronous type. Since such motors and generators are well known under the name of "Selsyn", they will be so designated herein.

Sun gear 41 is fixed upon a shaft 53 and driven thereby at a measuring speed. In order that the measuring speed may be varied, shaft 53 is connected through gearing 54 to the output disk 55 of a variable speed friction disk transmission. Rotation is imparted to disk 55 from a driving disk 56 through a transfer disk 57 fixed upon a shaft 58 which is journaled in a stationary bearing 59 and slidable axially therein.

Shaft 58 has its upper and lower ends journaled, respectively, in the free ends of an upper frame member 60 and a lower frame member 61 which have the other ends thereof pivotally connected to each other by a link 62 and have their free ends urged toward each other by a spring 63 so as to hold shaft 58 free from end play therebetween. Lower frame member 61 is pivoted upon a pin 64 and provided with a depending arm 61ª which has a pin or roller 65 arranged at its lower end and held in contact with a cam 66 by a spring 67.

Cam 66 is fixed upon a shaft 68 which rotates upon a stationary axis and has a gear 69 fixed thereon. Gear 69 meshes with a gear 70 which is connected through a reduction gear 71 to a reversible electric motor 72. The motor 72 in drive section C is adapted to be energized manually by means of push button switches arranged in a switch panel 73 (Fig. 1) while the motor 72 of each of sections B, D and E is adapted to be energized automatically by means of the mechanism shown in Figs. 4 and 5 as will be presently explained.

When electric motor 72 is energized and causes cam 66 to rotate in a counterclockwise direction, cam 66 will swing frame member 61 upon pin 64 and lower transfer disk 57, thereby reducing the speed of disk 55 relative to the speed of disk 56. When motor 72 is reversed so that cam 66 is rotated in a clockwise direction, cam 66 will permit spring 67 to swing frame member 61 upon pin 64 and raise transfer disk 57, thereby increasing the speed of disk 55 relative to the speed of disk 56.

The controller in drive section C has the disk 56 thereof driven at a constant speed by a constant speed electric motor 74 while the controller in each of sections B, D and E has the disk 56 thereof driven at a speed proportional to the output speed of drive section C by means of a Selsyn motor 74ª which is energized by the Selsyn generator 51 of section C. To this end, the Selsyn motors 74ª of sections B, D and E are connected by cables 75, 76 and 77 (Fig 1) to the Selsyn generator 51 of section C in parallel with the Selsyn motor 48 of that section which is connected thereto by cable 50 as previously explained.

Motor 74 or 74ª is connected through a reduction gear 78 (Fig. 2) to a gear 79 which meshes with a gear 80 fixed upon a shaft 81 upon which disk 57 is also fixed so that disk 57 is driven at a speed proportional to the speed of motor 74 or 74ª.

The arrangement is such that, if the speed of hydraulic motor 12 should decrease or if the speed of disk 55 should increase either by increasing the speed of Selsyn motor 74ª or by operating reversible motor 72 to move disk 57 upward, gear 40 would rotate slower relative to the speed of gear 41 and cause planet pinion 42 to be carried around sun gear 41 in a counterclockwise direction. Pinion 42 through arm 44 would rotate shaft 30 and crank 29 in a counterclockwise direction. Crank 29 would swing the upper end of lever 28 toward the right and cause valve 19 to be shifted toward the left to permit liquid to flow to servomotor 17 which would shift slide block 15 toward the left and increase pump displacement, thereby accelerating motor 12 to its former speed in case the motor speed has decreased or to a new speed in case Selsyn motor 74ª has been accelerated.

If the speed of hydraulic motor 12 should increase or if the speed of disk 55 should be decreased either by decreasing the speed of Selsyn motor 74ª or by operating reversible motor 72 to move disk 57 downward, gear 40 would rotate faster than gear 41 and carry planet pinion 42 around sun gear 41 in a clockwise direction. Pinion 42 would rotate shaft 30 and crank 29 in a clockwise direction. Crank 29 would swing the upper end of lever 28 toward the left and cause valve 19 to be shifted toward the right to permit liquid to escape from sorvo-motor 17 and permit springs 16 to shift slide block 15 toward the right and decrease pump displacement, thereby decelerating motor 12 to its former speed in case the motor speed has increased or to a new speed in case Selsyn motor 74ª has been decelerated.

Figures 3, 7:
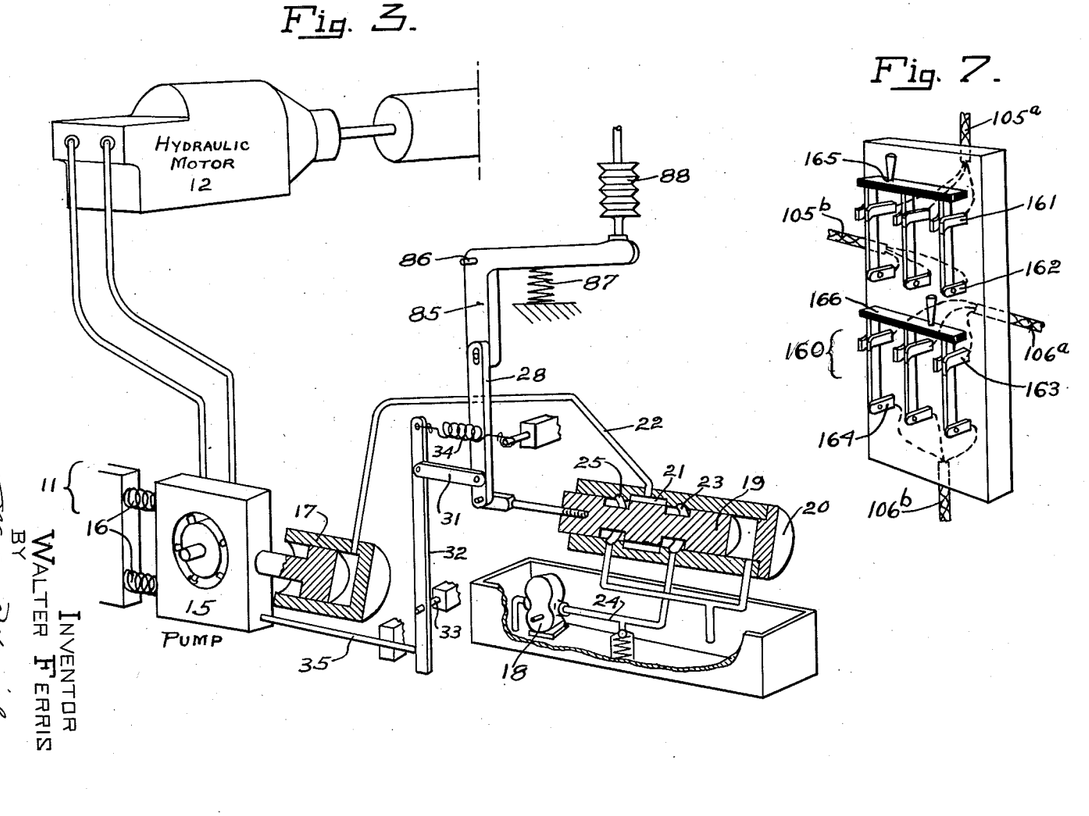
Fig. 3 is a schematic drawing of a controller which controls the operation of other of the drive sections.
Fig. 7 is a view showing a control switch in a position different from that shown in Fig. 6.

Referring now to Fig. 3, controller 14 differs from controller 13 in that the differential 39, the friction disk transmission and the drives therefor have been omitted therefrom and valve 19 is shifted in response to linear movement of some controlling member such as the lower frame 125 of storage unit 122 shown in Fig. 1 and to be presently described. Since other parts are the same as in controller 13, they have been indicated by the same reference numerals and further description thereof is deemed unnecessary.

As shown, lever 28 has its upper end pivoted to the depending arm of a bell crank lever 85 which is pivoted upon a stationary pin 86. The horizontal arm of lever 85 is urged upward by a spring 87 and is adapted to be moved downward against the resistance of spring 87 by an expansible fluid motor which has been shown as being a bellows 88.

When the force exerted upon lever 85 by bellows 88 overbalances the force exerted thereon by spring 87, lever 85 will cause valve 19 to be shifted toward the right and permit liquid to escape from servo-motor 17 so that spring 16 may shift slide block 15 toward the right to reduce the displacement of pump 11 and thereby reduce the speed of motor 12. When the force exerted upon lever 85 by bellows 88 is insufficient to balance the force exerted thereon by spring 87, lever 85 will cause valve 19 to be shifted toward the left and permit liquid from gear pump 18 to flow to servo-motor 17 and cause it to shift slide block 15 toward the left to increase pump displacement and thereby increase the speed of motor 12.

When slide block 15 is shifted in one direction or the other, valve 19 will be returned to its neutral position by the follow up mechanism 31—35 and adjustment of pump displacement will cease as soon as lever 85 ceases to move as previously explained in connection with the description of controller 13.

Bellows 88 is caused to expand and contract, and thereby cause lever 85 to operate, in response to the contraction or expansion of another bellows to which it is connected and which is caused to expand or contract in response to a variation in the speed of the web passing through the machine. As shown in Fig. 1, the bellows 88 in drive sections A, F and G are connected to other bellows 89ª, 89ᶠ and 89ᵍ by tubes 90ª, 90ᶠ and 90ᵍ respectively.

The tubes and bellows are completely filled with a fluid which is preferably a liquid having a low coefficient of expansion, and the effective volume of this liquid may be varied by means of manually operable volume regulators 91ª, 91ᶠ and 91ᵍ which are connected to tubes 90ª, 90ᶠ and 90ᵍ respectively. The volume regulator in any section may be operated to cause bellows 88 to expand or contract and operate controller 14 to effect in the previously described manner a variation in the speed of the machine unit driven by that section.

Figures 4, 5:
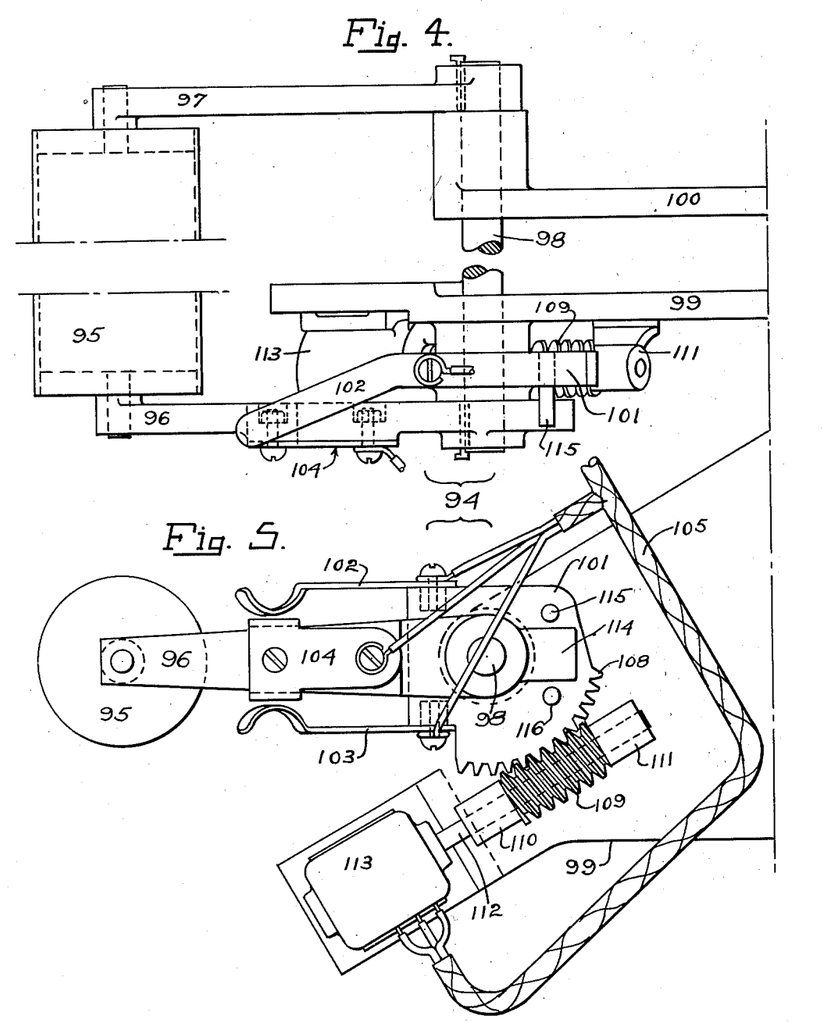
Fig. 4 is a top plan view of a float roll and electric switch assembly.
Fig. 5 is a front view of the mechanism shown in Fig. 4.

The reversible electric motors 72 (Figs. 1 and 2) in drive sections B, D and E may each be controlled by a mechanism of the type shown in Figs. 4 and 5 and indicated in its entirety by reference numeral 94. This mechanism includes a floating roller 95 which is journaled between the free ends of two arms 96 and 97 and normally supported in a loop of the web passing through the machine as will be presently explained.

Arms 96 and 97 have the other ends thereof fixed upon opposite ends of a shaft 98 which is journaled in two members 99 and 100 of the frame of the machine. The shaft 98 has a segmental gear block 101 journaled thereon between arm 96 and frame member 99. Gear block 101 carries two spaced apart spring contacts 102 and 103 the free ends of which are arranged upon opposite sides of a contact 104 which is carried by arm 96 and adapted to engage contact 102 when roller 95 is raised and to engage contact 103 when roller 95 is lowered. Arm 96 and gear block 101 are either made of insulating material or the contacts are suitably insulated therefrom.

The switch mechanism associated with each of drive sections B, D and E has the contacts 102, 103 and 104 thereof connected to the motor 72 in that section by means of a multi-wire cable 105, and motor 72 in section C is connected to switch panel 73 by a multi-wire cable 106, current for energizing motors 72 being supplied thereto through cables 105 and 106 from a suitable source.

Contact 104 is caused to engage contact 102 or 103 by the speed of the web at roller 95 varying relative to the speed at which the web passes through the adjacent machine unit. This variation in speed is caused by the web creeping or slipping as it passes through a machine unit or by shrinking or stretching during or after its passage through the unit, thereby causing the web to vary in length between adjacent units with a resultant variation in the length of the loop in which roller 95 is supported. Consequently, when that part of the web between the two adjacent units decreases in length, roller 95 will be raised and, when it increases in length, roller 95 will be lowered.

In each of sections D and E, switch mechanism 94 is so connected to motor 72 that when roller 95 is raised sufficiently to cause contact 104 to engage contact 102, motor 72 will be energized and rotate cam 66 (Fig. 2) in a direction to cause disk 57 to be raised and thereby effect in the previously described manner a decrease in the speed of motor 12 and, when roller 95 is lowered sufficiently to cause contact 104 to engage contact 103, motor 72 will be reversed to thereby effect an increase in the speed of motor 12.

Decreasing the speed of motor 12 will cause the web to travel past roller 95 at a slower rate and thereby cause the loop to increase in length and lower roller 95. Conversely, increasing the speed of motor 12 will cause the loop to be shortened and roller 95 to be raised.

In section B, switch mechanism 94 is so connected to motor 72 as to produce results opposite to the results produced in each of sections D and E. That is, when roller 94 is raised sufficiently to cause contact 104 to engage contact 102, motor 12 will be accelerated so that it will deliver web at a faster rate and thereby cause roller 95 to descend and, when roller 95 is lowered sufficiently to cause contact 104 to engage contact 103, motor 12 will be decelerated and deliver web at a slower rate, thereby causing roller 95 to be raised.

The speed of motor 12 will continue to be varied as long as contact 104 remains in engagement with contact 102 or 103. Therefore, if no antihunting means were provided, the speed of motor 12 and the speed of the web at roller 95 would continue to increase or to decrease until roller 95 had been lowered or raised enough to move contact 104 out of engagement with one of contacts 102 or 103 at which time the speed of motor 12 and the speed of the web would have been changed so much that roller 95 would continue to rise or lower until contact 104 engaged the other of contacts 102 or 103, thereby causing motor 12 to hunt.

In order to prevent motor 12 from hunting, a worm gear segment 108 is secured to or formed in gear block 101 and meshes with a worm 109 which is restrained from axial movement by being arranged between two bearings 110 and 111 carried by frame member 99. Worm 109 is fixed upon a shaft 112 which is journaled in bearings 110 and 111 and connected to the rotor of a reversible electric motor 113 carried by frame member 99. Motor 113 is connected to cable 105 in parallel with motor 72.

The arrangement is such that, when floating roller 95 moves upward or downward enough to bring contact 104 into engagement with contact 102 or contact 103, motors 72 and 113 are simultaneously energized. Motor 72 will cause hydraulic motor 12 to be decelerated or accelerated in the previously described manner and motor 113 will rotate gear block 101 upon shaft 98 to move contacts 102 and 103 in the same vertical direction in which the floating roller 95 is moving with the result that the circuit is broken to deenergize motors 72 and 113 and hydraulic motor 12 ceases to decelerate or to accelerate as soon as roller 95 ceases to move vertically, thereby preventing motor 12 from hunting.

In order to prevent the weight of roller 95 from resting upon contact 103 and deforming it before the web is threaded through the machine or when the web breaks and to prevent roller 95 from being raised so high during the threading of the web through the machine that contact 102 might be deformed, arm 96 is provided with an extension 114 and gear block 101 is provided with two stops 115 and 116 which are arranged upon opposite sides of extension 114 and limit the vertical movement of roller 95 relative to contacts 102 and 103.

Machine unit 1 (Fig. 1) is shown as being adapted to unwind a strip or web 120 of film from a suitably supported stock roll 121 and deliver it to a storage unit 122 from which the web is drawn by machine unit 2.

Storage unit 122 is shown as having three upper rollers 123 and two lower rollers 124. Rollers 123 rotate upon stationary axes while rollers 124 are carried in a vertically movable frame 125 beneath which bellows 89ª is arranged in a stationary position. Web 120 passes over the upper and lower rollers alternately and then into machine unit 2 so that lower roller 124 and frame 125 are supported by web 120.

Drive section A may be initially adjusted, as by operating volume regulator 91ª to adjust the displacement of pump 11 as previously explained, so that machine unit 1 will deliver film to storage unit 122 either at the correct rate or at a rate slightly in excess of the rate at which machine unit 2 draws film from storage unit 122.

When unit 1 delivers film to storage unit 122 faster than unit 2 draws it therefrom, frame 125 will move downward and, when it has moved far enough downward, it will engage and compress bellows 89ª and thereby cause motor 12 of section A to be decelerated in the previously described manner so as to reduce the rate at which unit 1 delivers film to storage unit 122.

The function of storage unit 122 is to permit stock roll 121 when exhausted to be replaced by a new stock roll without stopping the machine. This may be accomplished by operating regulator 91ª to reduce the displacement of pump 11 to zero and thereby stop unit 1, then replacing roll 121 with a new stock roll, then attaching the end of the web forming the new stock roll to the end of web 120, and then operating regulator 91ª to start unit 1.

During the interval unit 1 is idle, unit 2 may continue to draw film from storage unit 122 and raise rollers 124, thereby supplying the machine with the film previously stored in storage unit 122.

From machine unit 2, web 120 passes through unit 3, all of units 4 and unit 5 successively, and it is guided from one unit to the next by suitable rollers which are represented by guide rollers 126, 127, 128, 129, 130, 131, 132, 133, 134 and 135.

The speeds of drive sections B, D and E, and consequently the speeds of machine units 2, 4 and 5, are primarily controlled by master drive section C in the previously described manner due to the fact that the Selsyn motor 74ª in sections B, D and E are driven in synchronism with Selsyn motor 48 of section C by current supplied thereto by Selsyn generator 51 of section C.

The speeds of drive sections B, D and E, and consequently the speeds of machine units 2, 4 and 5, are secondarily controlled by switch mechanisms 94 each of which has its floating roller 95 supported in a loop of web 120. One switch mechanism 94 is arranged immediately behind unit 2 and one switch mechanism 94 is arranged immediately ahead of each of units 4 and 5.

From unit 5, web 120 passes into a storage unit 140 from which it is drawn by unit 6 and delivered thereby to unit 7 which winds it into a roll 141, web 120 being guided from one unit to the next by suitable rollers which are represented by guide rollers 142, 143, 144 and 145.

Storage unit 140 has been shown as having an upper roller 146, which rotates upon a stationary axis, and two lower rollers 147 which are carried by a vertical movable frame 148 having an abutment 149 extending upward therefrom. Web 120 passes around the upper and lower rollers alternately so that rollers 147 are supported in loops which lengthen and shorten and thereby lower and raise rollers 147 and frame 148 as the speed of unit 6 varies relative to the speed of unit 5.

Bellows 89f is arranged in a stationary position immediately above abutment 149 so that, when rollers 147 are raised high enough, abutment 149 will engage and compress bellows 89f and cause controller 14 to reduce the displacement of pump 11 and thereby decelerate motor 12 of drive section F. Decelerating motor 12 of section F will cause unit 6 to draw film from storage unit 140 at a slower rate so that rollers 147 cease to move upward. The speed of drive section F, and consequently the speed of machine unit 6, is thus adjusted by controller 14 which is operated in response to abutment 149 engaging and disengaging bellows 89f.

Since the diameter of roll 141 increases as web 120 is wound thereon, the speed of unit 7 must be gradually decreased in order that the peripheral speed of roll 141 may equal the linear speed at which web 120 is discharged by unit 6.

In order to regulate the speed of unit 7, a floating roller 150 is supported in a loop of web 120 and provided with an abutment 151 to engage bellows 89g which is arranged immediately above it in a stationary position. The arrangement is such that, as roll 141 increases in diameter and increases the speed at which web 120 is wound thereon, roller 150 will be raised and cause abutment 151 to compress bellows 89g to thereby effect operation of controller 14 and cause unit 7 to be decelerated as previously explained.

The function of storage unit 140 is to permit continued operation of the machine while a completed roll 141 of processed film is removed from unit 7 and replaced by a new core upon which a new roll of processed film may be wound.

This may be accomplished by stopping units 6 and 7, as by operating regulators 91f and 91g to adjust pumps 11 in sections F and G to zero displacement, then removing roll 141 and substituting a new core to which the end of web 120 may be attached, and then operating regulators 91f and 91g to start drive sections F and G and to cause them to drive units 6 and 7 faster than machine unit 5 is being driven in order to draw from storage unit 140 the excess film stored therein during the interval that units 6 and 7 were idle.

The machine may initially be started by closing suitable switches in panel 73 to energize the power motor 10 in each drive section and the motor 74 in drive section C. Then, if necessary, the speeds of units 2, 4 and 5 may be individually adjusted relative to the speed of section 3 by manually pressing the contact 102 or 103 against the contact 104 of the switch mechanism 94 associated with the section which drives the unit to be adjusted, thereby providing an initial draw between adjacent units when necessary or desired.

Web 120 may then be threaded through the machine and attached to the core of roll 141, and then a switch in panel 73 may be closed to energize motor 72 in section C and cause it to adjust friction disk transmission 55—56—57 until section C is driving unit 3 at the desired speed.

Adjusting section C to regulate the speed of unit 3 will cause drive sections B, D and E to be simultaneously adjusted to drive units 2, 4 and 5 at speeds proportional to the speed of unit 3 as previously explained. Due to disk 56 in the controller 13 of section C being driven at a constant speed by constant speed motor 74, section C after being adjusted will drive unit 3 at a constant speed and cause it to pass web 120 therethrough at a constant speed.

If the speed at which web 120 passes out of machine unit 2 varies from the speed at which it enters machine unit 3, the switch mechanism 94 of machine unit 2 will be operated and cause the controller 13 of drive section B to adjust that section to correct such variations in speed.

If the speed at which unit 1 unwinds web 120 from roll 121 varies from the speed at which machine unit 2 draws web 120 from storage unit 122, bellows 88 and 89a will operate controller 14 and cause it to adjust drive section A to correct such variation in speed.

If the action of machine unit 3 causes web 120 to vary in length or if the first machine unit 4 following master unit 3 is not properly adjusted so that unit 4 draws in web 120 at a rate which varies from the rate at which web 120 passes from machine unit 3, the switch mechanism 94 between those two units will be operated and cause the controller 13 of the drive section D which drives that unit 4 to adjust that section to correct such variation in speed.

If the action of any machine unit 4 causes web 120 to vary in length or if the machine unit 4 or 5 following that unit is not properly adjusted so that the following unit draws in web 120 at a rate which varies from the rate at which web 120 passes from the preceeding unit, the switch mechanism 94 between those two units will be operated and cause the controller 13 of the drive section D or E which drives the following unit to adjust that section to correct such variation in speed.

If the speed at which machine unit 6 draws web 120 from storage unit 140 varies from the speed at which machine unit 5 delivers web 120 thereto, bellows 88 and 89f will operate the controller 14 of drive section F and cause it to adjust that drive section to correct such variation in speed.

If machine unit 7 tends to wind web 120 upon roll 141 at a rate which varies from the rate at which web 120 passes from machine unit 6, bellows 88 and 89g will operate the controller 14 of drive section G and cause it to adjust that drive section to correct such variation in speed.

Drive section C thus functions as a master section and controls the operation of all of the other sections.

In the manufacture or processing of certain types of materials, a given number of manufacturing or processing steps are required while other types of material require additional steps.

If one type of material requires nearly as many steps as another type, the web 120 of the type requiring the fewer number of steps may be detoured around one or more of the intermediate machine units 4 as by leading it over guide rollers placed above the unused units as is customary in the manufacture of paper.

However, if the manufacture or processing of one type of material consists of a large number of steps and the manufacture or processing of another type of material requires a large number of additional steps, two machines of the type shown in Fig. 1 may be arranged adjacent each other so that the two machines may operate independently of each other to make or process certain types of material and operate in conjunction with each other to make or process other types of material.

When two or more machines are arranged adjacent each other for this purpose, a part of the machine units are arranged above the other units in order to reduce to a minimum the distance through which the material must travel in passing from one machine to the other. For example, both machines may have the sections 3 and 4 thereof arranged upon a lower floor and the sections 1, 2, 5, 6 and 7 thereof arranged upon an upper floor.

Figure 6:
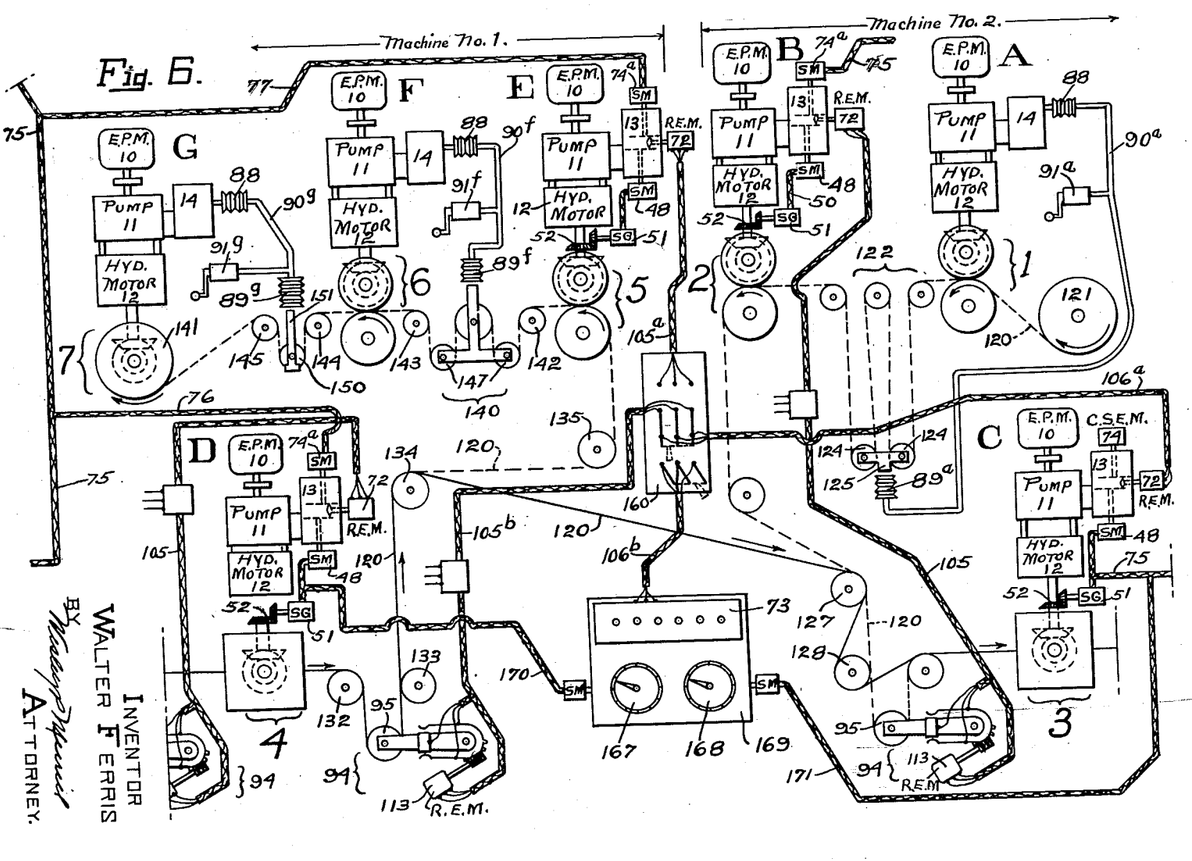
Fig. 6 is a diagram showing how two of the drives shown in Fig. 1 may be combined to enable the machines driven thereby to function as a single machine.

Figure 6

For the purpose of illustration, this figure shows the rear part of a machine designated as machine number 1 arranged adjacent the front end of a machine designated as machine number 2 so that the two machines may either operate independently of each other or function as a single machine.

Since both machines are identical to the machine shown in Fig. 1 except for the addition of control means to permit the machines to be jointly controlled, the parts shown have been indicated by the same reference characters employed to designate the corresponding parts of the machine shown in Fig. 1.

In order that the two machines may be either separately or jointly controlled, the cable 105 leading to controller 13 in drive section E of machine number 1 is divided into two sections 105ª and 105ᵇ, the cable 106 leading to the controller 13 in drive section C of machine number 2 is divided into two sections 106ª and 106ᵇ, and a switch carried by a panel 160 is interposed between the two sections of each cable.

Switch panel 160 is provided with four sets of terminals which have been indicated in Fig. 7 by reference numerals 161, 162, 163 and 164, a multi-blade knife switch 165 which is pivoted to terminals 162 and adapted to be swung into contact either with terminals 161 or 163, and a multi-blade knife switch 166 which is pivoted to terminals 164 and adapted to be swung either into contact with terminals 163 or into open position. Terminals 161 and 162 have the wires of cable sections 105ª and 105ᵇ connected thereto respectively, and terminals 163 and 164 have the wires of cable sections 106ª and 106ᵇ connected thereto respectively.

When switch 165 is in contact with terminals 161 and switch 166 is in contact with terminals 163 as shown in Fig. 7, cable section 105ª is connected to cable section 105ᵇ and cable section 106ª is connected to cable section 106ᵇ so that both machines may operate independently of each other in the previously described manner, the path of web 120 through units 5, 6 and 7 of machine number 1 and through units 1 and 2 of machine number 2 when the machines are operating independently of each other being indicated in Fig. 6 by dotted lines.

When switch 166 is swung to open position and switch 165 is swung out of contact with terminals 161 and into contact with terminals 165 as shown in Fig. 6, cable section 105ª will be disconnected from cable section 105ᵇ and cable section 106ª will be disconnected from cable section 106ᵇ and connected to cable section 105ᵇ so that drive sections E, F and G of machine number 1 are uncontrolled and drive section C of machine number 2 is controlled by the switch mechanism 94 arranged immediately behind the last unit 4 of machine number 1.

In order that the two machines may operate upon the same web 120, it is necessary that the speed of unit 3 in machine number 2 be substantially equal to the speed of the last unit 4 of machine number 1 before web 120 passes to machine number 2.

This may be accomplished by means of two speed indicators 167 and 168 of which only the dials and hands have been shown but it is to be understood that each may be driven by a Selsyn motor. Speed indicators 167 and 168 may be arranged upon a panel 169 to which switch panel 73 of machine number 2 is attached, and the motors of indicators 167 and 168 may be connected by cables 170 and 171, respectively, to the Selsyn generator 51 in the last section D in machine number 1 and the Selsyn generator 51 in section C of machine number 2 so that indicator 167 will indicate the speed of the last unit 4 in machine number 1 and indicator 168 will indicate the speed of unit 3 of machine number 2.

When both machines are to operate upon the same web 120, units 1, 2, 3 and 4 of machine number 1 are started and units 5, 6 and 7 thereof are caused to remain idle by operating certain switches in panel 73 of machine number 1. Then web 120 or a leader strip in lieu thereof is threaded through units 1, 122, 2 and 3 and through as many units 4 as necessary or desired.

When the leading end of the web or strip passes through the last unit 4 in machine number 1, units 3, 4 and 5 of machine number 2 are started and units 1 and 2 thereof are caused to remain idle by operating certain switches in panel 73 of machine number 2.

Then by closing one or another of two switches in panel 73 of machine number 2, the speed of unit 3 of machine number 2 may be increased or decreased until it is approximately the same as the speed of the last unit 4 of machine number 1 as shown by indicators 167 and 168. Then the leading end of the web or strip is passed into unit 3 of machine number 2 and switches 165 and 166 are swung from the position shown in Fig. 7 to the position shown in Fig. 6 so that unit 3 of machine number 2 is placed under the control of the switch mechanism 94 arranged immediately behind the last unit 4 of machine number 1 through which the web or strip passes. The leading end of the web or strip is then led successively through as many units 4 as necessary or desired, through unit 5, around the rollers of storage unit 140 and through unit 6 to unit 7.

Thereafter, the operating drive sections of each machine will be under the control of section C of that machine as previously explained, and section C of machine number 2 will be under the control of section C of machine number 1 which will then act as a master for all of the other operating sections of both machines.

The sectional drive herein set forth may be modified in various ways and adapted to various machines without departing from the scope of the invention which is hereby claimed as follows:

1. The combination, with a plurality of separate elements which are to be driven at proportional speeds, of a plurality of primary prime movers which are not necessarily synchronized, a transmission connecting each of said primary prime movers to one of said elements and consisting primarily of a generator driven by said primary prime mover and a secondary prime mover connected to that element to drive the same and operated by energy supplied thereto from said generator, a regulator for adjusting each of said transmissions to vary the speed of the secondary prime mover thereof relative to the speed of the primary prime mover associated therewith, means for adjusting one of said regulators to enable the transmission controlled thereby to function as a master, and means for adjusting at least one other regulator to cause the transmission controlled thereby to follow said master transmission in respect to all changes in the output speed thereof, said last named means including a differential gear having one leg thereof driven at a speed proportional to the output speed of said master transmission and a second leg thereof driven at a speed proportional to the output speed of said follower transmission whereby the third leg of said differential reflects any variation in the output speed of said follower transmission relative to the output speed of said master transmission, and means for transmitting motion from said third leg to the regulator of said follower transmission to cause it to correct any variation in the output speed of said follower transmission relative to the output speed of said master transmission.

2. The combination, with a plurality of separate elements which are to be driven at proportional speeds, of a plurality of primary prime movers which are not necessarily synchronized, a transmission connecting each of said primary prime movers to one of said elements and consisting primarily of a generator driven by said primary prime mover and a secondary prime mover connected to that element to drive the same and operated by energy supplied thereto from said generator, a regulator for adjusting each of said transmissions to vary the speed of the secondary prime mover thereof relative to the speed of the primary prime mover associated therewith, a constant speed element, means responsive to the output speed of one of said transmissions varying relative to the speed of said constant speed element for adjusting the regulator of that transmission to correct such variation and thereby maintain the output speed of that transmission substantially constant and enable that transmission to function as a master, and means for adjusting at least one other regulator to cause the transmission controlled thereby to follow said master transmission in respect to all changes in the output speeds thereof, said last named means including a differential gear having one leg thereof driven at a speed proportional to the output speed of said master transmission and a second leg thereof driven at a speed proportional to the output speed of said follower transmission whereby the third leg of said differential reflects any variation in the output speed of said follower transmission relative to the output speed of said master transmission, and means for transmitting motion from said third leg to the regulator of said follower transmission to cause it to correct any variation in the output speed of said follower transmission relative to the output speed of said master transmission.

3. The combination, with a plurality of machine units for operating upon material passed therethrough, of a sectional drive having a drive section for each of said units and including a hydraulic motor for driving a unit, a pump for supplying liquid to said motor to drive the same, means for varying the displacement of said pump to thereby vary the speed of said motor, and a prime mover for driving each of said pumps, said prime movers being not necessarily synchronized with each other, means for regulating one of said drive sections to enable it to function as a master, and means operated by said material and responsive to a variation in the speed of said material at at least one other section relative to the speed of said material at said master section for operating the displacement varying means in said other section to thereby correct said variation in speed and cause said other section to follow said master section.

4. The combinaiton, with a plurality of machine units which are to be driven at proportional speeds, of a sectional drive having a drive section for each of said units and including a hydraulic motor for driving a unit, a pump for supplying liquid to said motor to drive the same, means for varying the displacement of said pump to thereby vary the speed of said motor, and a prime mover for driving each of said pumps, said prime movers being not necessarily synchronized with each other, a constant speed element, means responsive to the output speed of one of said drive sections varying relative to the speed of said element for operating the displacement varying means in that section to thereby correct said variation in speed and to enable that section to function as a master, and means responsive to a variation in the output speed of at least one other section relative to the output speed of said master section for operating the displacement varying means in said other section to thereby correct said variation in speed and cause said other section to follow said master section.

5. The combination, with a machine unit for operating upon material passing therethrough, of a secondary prime mover for driving said unit, a generator for supplying energy to said secondary prime mover to drive the same, a primary prime mover for driving said generator, means for varying the flow of energy to said secondary prime mover to thereby vary the speed thereof, a controller including a three-legged differential having one input leg rotated at a measured speed and the other input leg rotated at a speed proportional to the speed of said secondary prime mover whereby the output leg of said differential will rotate in response to a variation between the relative speeds of said input legs, means for operating said energy varying means in response to rotation of said output leg, and means responsive to a variation in the speed of said material for varying the ratio between said input legs to thereby cause rotation of said output leg.

6. The combination, with a machine unit for operating upon material passing therethrough, of a hydraulic motor for driving said unit, a pump for supplying liquid to said motor to drive the same, a prime mover for driving said pump, means for adjusting the displacement of said pump, a controller including a three-legged differential having one input leg rotated at a measured speed and the other input leg rotated at a speed proportional to the speed of said motor whereby the output leg of said differential will rotate in response to a variation between the relative speeds of said input legs, means for operating said displacement adjusting means in response to rotation of said output leg, and means responsive to a variation in the speed of said material for varying the ratio between said input legs to thereby cause rotation of said output leg.

7. The combination, with two machine units for operating upon material passed therethrough, of a master drive section for driving one of said units, a follower drive section for driving the other unit, means for adjusting each section to vary the output speed thereof and thereby vary the speeds of said units, means for operating the adjusting means of said follower section in response to a variation between its output speed and the output speed of said master section, and other means for operating the adjusting means of said follower section in response to a variation in the speed of said material relative to the speed of one of said units.

8. A sectional drive, for driving a plurality of machine units which operate upon material passed therethrough, comprising a master drive section for driving one of said units, a follower drive section for driving each of the other units, means for adjusting each section to vary the output speed thereof and thereby vary the speeds of said units, means for operating the adjusting means of each of certain follower sections in response to a variation between its output speed and the output speed of said master section, and other means for operating the adjusting means of each of certain follower sections in response to the speed of the material passing through certain units varying relative to the speeds of said certain units.

9. The combination, with a plurality of machine units for operating upon material passed therethrough, of a drive section for driving each of said units, means for adjusting each of said sections to vary the output speed thereof and thereby vary the speed of said units, a controller for operating each of said adjusting means, means for causing at least one of said controllers to operate in response to variations between the output speed of the section controlled by it and the output speed of another section, means for causing at least one of said controllers to operate in response to variations in the speed of said material relative to the speed of a machine unit, and at least one of said controllers being provided with means for causing it to operate in response to variations between the output speed of the section controlled by it and the output speed of another section and also with means for causing it to operate in response to variations in the length of the material between one machine unit and the unit driven by the section controlled by that controller.

10. In a group of related machine units for operating upon a web passing therethrough, the combination of a drive section for driving one of said units, a controller for said drive section including a three-legged differential having one input leg rotated at a measured speed and its other input leg rotated at a speed proportional to the output speed of said drive section whereby the output leg of said differential will rotate in response to a variation between the relative speeds of said input legs, means responsive to rotation of said output leg for adjusting said drive section to vary the output speed thereof and thereby vary the speed of the unit driven by said section, means for varying the ratio between said input legs to thereby cause rotation of said third leg, a reversible electric motor for operating said ratio varying means, a floating roller carried in a loop of said web arranged between the unit driven by said section and an adjacent unit, and means for energizing said reversible motor including a reversing switch operated in response to vertical movement of said roller.

11. In a group of related machine units for operating upon a web passing therethrough, the combination of a hydraulic-motor for driving one of said units, a pump for supplying liquid to said motor to drive the same, a prime mover for driving said pump, means for adjusting the displacement of said pump, a controller including a three-legged differential having one input leg rotated at a measured speed and the other input leg rotated at a speed proportional to the speed of said motor whereby the output leg of said differential will rotate in response to a variation between the relative speeds of said input legs, means for operating said displacement adjusting means in response to rotation of said output leg, means for varying the ratio between said input legs to thereby cause rotation of said third leg, a reversible electric motor for operating said ratio varying means, a floating roller carried in a loop of said web arranged between the unit driven by said hydraulic motor and an adjacent unit, and means for energizing said reversible motor including a reversing switch operated in response to vertical movement of said roller.

12. The combination, with a first machine and a second machine each consisting of a plurality of independently driven units and adapted to operate upon a substantially continuous web of material passed therethrough, of a sectional drive for each of said machines including a drive section for driving each unit, each drive including a master section and a plurality of follower sections having the speeds thereof controlled by said master section, and means for placing the master section of the second machine under the control of the first machine to thereby enable both of said machines to operate simultaneously upon the same web of material.

13. The combination, with a first machine and a second machine each consisting of a plurality of independently driven units and adapted to operate upon a substantially continuous web of material passed therethrough, of a sectional drive for each of said machines including a drive section for driving each unit, each drive including a master section and a plurality of follower sections arranged both ahead of and behind said master section and having the speeds thereof controlled by said master section, means for causing at least one follower section at the rear end of the first machine and at least one follower section at the front end of the second machine to remain idle, and means for placing the master section of the second machine under the control of the rearmost operating section of the first machine to thereby enable both of said machines to operate simultaneously upon the same web of material.

14. The combination, with a first machine and a second machine each consisting of a plurality of independently driven units and adapted to operate upon a substantially continuous web of material passed therethrough, of a sectional drive for each of said machines including a drive section for driving each unit, each drive including a master section and a plurality of follower sections having the speeds thereof controlled by said master section, means for synchronizing the speeds of said machines, and means for placing the master section of the second machine under the control of the first machine to thereby enable both of said machines to operate simultaneously upon the same web of material.

WALTER FERRIS.